United States Patent [19]

Ligh

[11] Patent Number: 4,655,160
[45] Date of Patent: Apr. 7, 1987

[54] DECK BOX

[75] Inventor: David R. Ligh, 700 NE. 26 Ave., Ft. Lauderdale, Fla. 33304

[73] Assignee: David R. Ligh, Fort Lauderdale, Fla.

[21] Appl. No.: 873,269

[22] Filed: Jun. 6, 1986

Related U.S. Application Data

[63] Continuation of Ser. No. 774,385, Sep. 10, 1985, abandoned, which is a continuation of Ser. No. 367,475, Apr. 12, 1982, abandoned.

[51] Int. Cl.$^4$ ............................................. F16K 37/00
[52] U.S. Cl. .................................... 116/277; 116/284; 116/309
[58] Field of Search ....................... 116/277, 309, 284; 251/355

[56] References Cited

U.S. PATENT DOCUMENTS

| Re. 17,724 | 7/1930 | Nordstrom | 251/355 |
|---|---|---|---|
| 141,521 | 8/1873 | Starr | 116/277 |
| 580,252 | 4/1897 | Christie | 116/277 |
| 630,278 | 8/1899 | Wiley | 116/277 |
| 1,251,792 | 1/1918 | Lofton | 116/277 |
| 1,386,065 | 8/1921 | Lofton | 116/277 |
| 2,379,517 | 7/1945 | Hadden | 116/277 |
| 2,436,583 | 2/1948 | Lear | 116/284 |
| 2,515,837 | 7/1950 | Quinn | 116/277 |
| 2,767,681 | 10/1956 | Pontius | 116/277 |
| 2,959,149 | 11/1960 | Schwenk | 116/277 |
| 2,984,127 | 5/1961 | Schwenk | 116/277 |
| 3,505,972 | 4/1970 | Benjamin | 116/277 |

Primary Examiner—Charles Frankfort
Assistant Examiner—Denis E. Corr
Attorney, Agent, or Firm—Cushman, Darby & Cushman

[57] ABSTRACT

Deck access box connected to a deck of a ship and to reach rods to operate valves below decks. The deck access box is fixed to the ship's deck. The deck access box includes a spindle connected to the reach rod by a suitable coupling. The top end of the spindle includes a recess used to turn the spindle which in turn operates the valve. The spindle has indicator apparatus coupled to it to show the travel position of the valve. The indicator apparatus includes indicators and a new and improved transmission for regulating the movement of the indicators to provide a uniform, non-intermittent, and continuous position indicator of the valve open-close status. The indicators are adjustable, rotate and travel a circular distance proportionally equal to the travel of the gate or other closing device of the valve, such as a door, gate, plug valve or other device.

5 Claims, 5 Drawing Figures

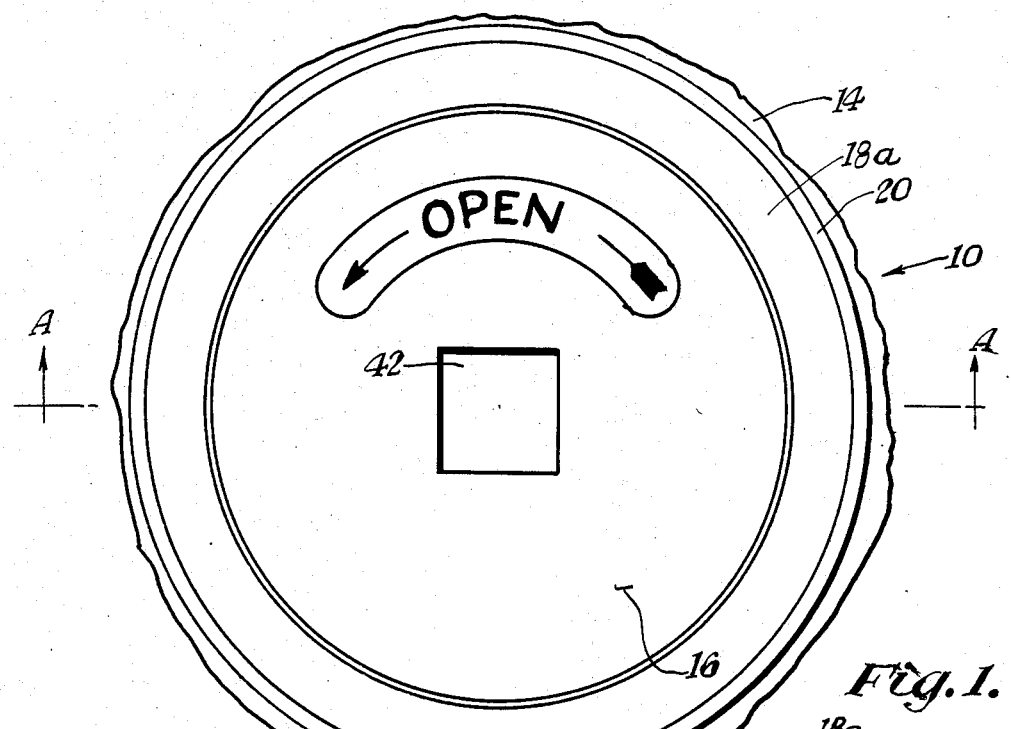
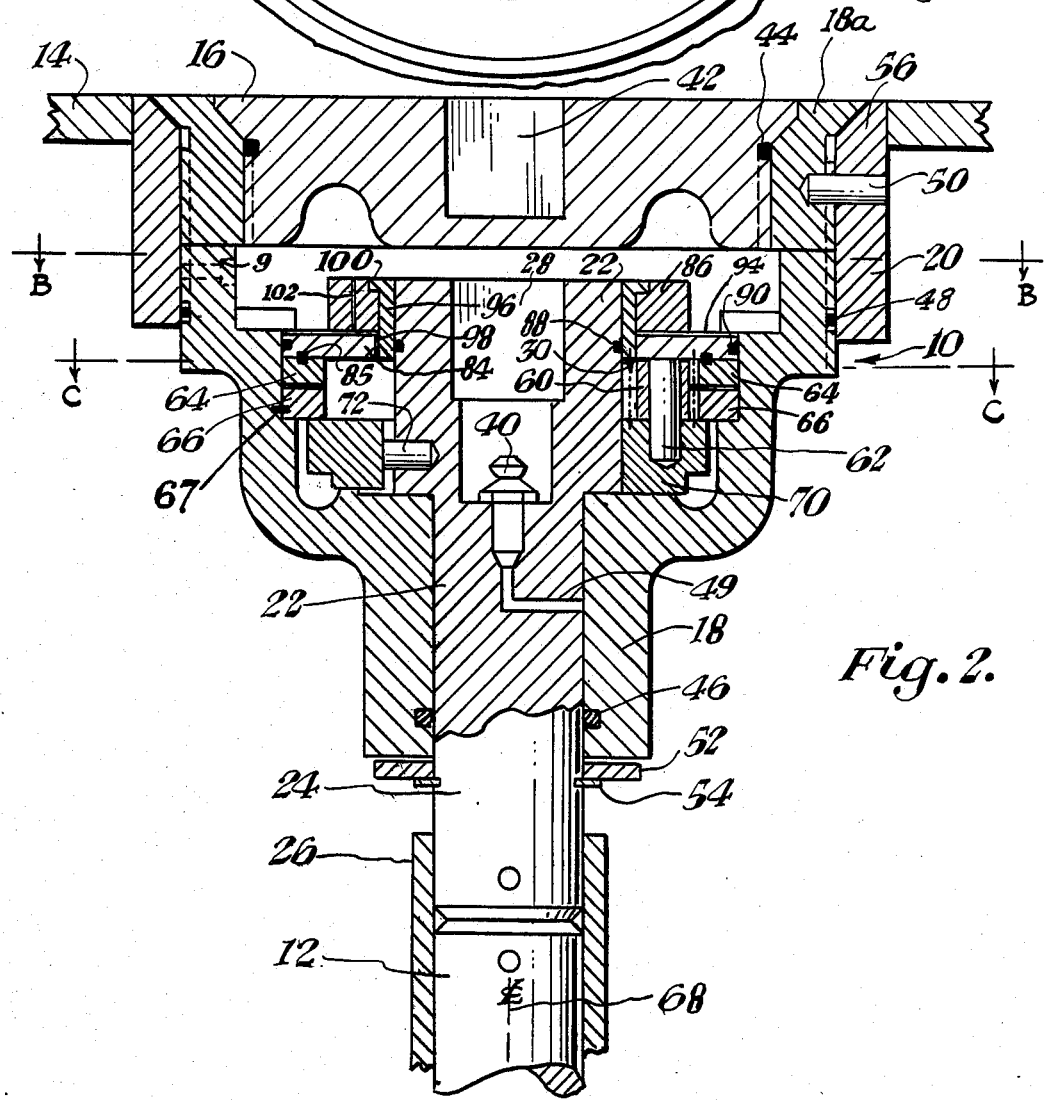
Fig. 1.
Fig. 2.

DECK BOX

This is a continuation of application Ser. No. 774,385, now abandoned, filed Sept. 10, 1985, which is a continuation of Ser. No. 367,475, filed Apr. 12, 1982, which was abandoned upon the filing of Ser. No. 774,385.

BACKGROUND OF THE INVENTION

Prior art deck boxes such as U.S. Pat. Nos. 3,505,972, 2,984,127, 2,959,149, 580,252, 1,251,792, 630,278, 2,515,837 and 1,386,065 have not provided the new and improved design disclosed in this application. The present invention overcomes many of the problems associated with the prior art devices as well as manufacturing problems.

SUMMARY OF THE INVENTION

The subject of this invention pertains to a new and improved deck access box used to operate valves on large ships and other mechanical devices. Large ships have many tanks located in various areas of the ship, such as ballast tanks, fresh water tanks, lubicating oil tanks, fuel oil tanks and others. In order to control the flow of the liquid going into and going out of the tank there are valves, both plug and gate type. Most of these valves are located in inaccessible places and down at the bottom of the vessel. It is impractical to send a man down to the valve location to open or close these valves, especially when the ship is sinking, therefore it is old in the art to provide reach rods to connect the valve by rods to an operating device on the deck. One type operating device located on the deck is known as a deck access box for use to operate the valve below deck.

The deck access box is made watertight with a cover and the deck access box has an outer shell welded or bolted into the ship's deck. In the center of the box is a spindle which protrudes out the lower portion of the box. This shaft protrusion connects to the reach rod by a suitable coupling. Into the top end of the spindle is a recess, usually square, into which a Tee wrench is inserted to turn the spindle which in turn operates the valves by the reach rods.

The spindle has indicator apparatus coupled to it and this indicator apparatus has movable indicator means that will show the travel position of the valve from open to close including any intermediate position in relation to an indicator fixed to the shell. This indication is most important as the operator need to know whether the liquids are flowing or not by the relative open-close position of the valve. The indicator apparatus is connected between the spindle and the indicator fixed to the shell of the deck box. This invention includes a new and improved indicator transmission for measuring the movement of the movable indicator means.

The indicator transmission is designed to provide a uniform, non-intermittent, and continuous position indicator of the below deck valve open-close status. The indicator means includes a pointer that rotates and travels a circular distance proportionally equal to the travel of the valve or gate or other closing device, such as a door, gate, plug valve or other device. The design provides a sturdy mechanism which will give many years of service. The design also provides a watertight enclosure with a weldable shell or sleeve. Also the deck access box is easily installed and set to correspond with the valve actual position. A lubrication fitting is provided in the deck access box which facilitates lubrication of the spindle from the deck. Further the design provides an indicator means including an adjustable pointer combination which can be adjusted with a first pointer to show "Shut" position and second pointer to indicate "Open" position.

It is an object of this invention to provide a uniform, non-intermittent, and continuous position indicator apparatus of the below deck devices open-close status.

It is another object of this invention to provide a pointer that rotates and travels a circular distance proportionally equal to the travel of the valve or other closing device, such as a door, gate, plug valve or other device.

It is another object of this invention to provide a sturdy deck box and indicator apparatus which will give many years of service.

It is another object of this invention to provide a watertight enclosure with a weldable sleeve.

It is another object of this invention to provide a deck access box easily installed and set to correspond with the actual operating position of the below deck device.

It is another object of this invention to provide a deck access box which is easily lubricated from the deck.

It is another object of this invention to provide an adjustable pointer combination which can easily be adjusted with a pointer to show "Shut" position and second pointer to indicate "Open" position.

It is another object of this invention to provide a watertight connection between the sleeve and body of the deck box.

It is a further object of this invention to provide for disconnecting the lower portion of the body from the sleeve to avoid heat damage to the device when welding the sleeve into the deck.

BRIEF DESCRIPTION OF THE DRAWINGS

In the drawings:

FIG. 1 is a top view of the deck box.

FIG. 2 is a cross section of FIG. 1 taken along line A—A and looking in the direction of the arrows.

DESCRIPTION OF THE PREFERRED EMBODIMENT

Figure 3:
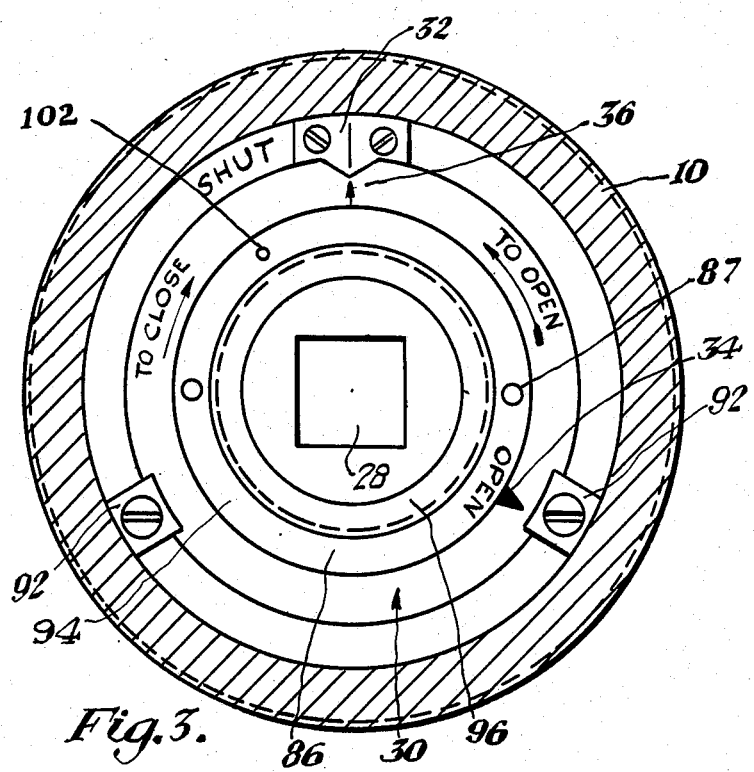
FIG. 3 is a top view of FIG. 1 Section BB and looking in the direction of the arrows in FIG. 2 with the removable cover removed.

Referring now to the drawings FIGS. 1 and 2, the new and improved deck access box 10 is used to operate below deck valves (not shown) on large ships and other mechanical devices. Large ships (not shown) have many tanks located in various areas of the ship, such as ballast tanks, fresh water tanks, lubricating oil tanks, fuel oil tanks and others. In order to control the flow of the liquid going into and going out of the tank there are valves, both plug and gate type. Most of these valves are located in inaccessible places and down at the bottom of the vessel. It is impractical to send a man down to the valve location to open or close these valves, especially when the ship is sinking. Therefore it is old in the art to provide reach rods 12 to connect the valve by rods to an operating device in the deck access box 10 on the deck 14. One type operating device located on the deck is known as a deck access box used to operate the valve below deck (not shown).

The deck access box assembly is shown in FIG. 1 and consists of a two part body, the upper shell 18a and a lower shell 18 usually made of cast bronze or aluminum, a cover 16 that screws into the body and an outer sleeve 20. Tee wrench opening 42 may be used to remove the cover 16. "O" ring 44 is used to seal the cover 16 watertight. A spindle 22 is positioned in the center of the body and is free to rotate. Turning of the spindle is accomplished by a Tee wrench (not shown) which has a square end and it is inserted into the square recess 28 of the spindle 22. The same wrench fits in the cover opening 42. Lubrication of the spindle 22 is afforded by lubrication fitting 40 through which grease flows by the internal passages such as 49 to the bearing surfaces. The upper shell 18a is screwed to sleeve 20 and sealed by taper mating surfaces with the outer sleeve and locked in position by pin 50. The lower shell 18 screws into sleeve 20 and is sealed by "O" ring 48.

The spindle 22 is sealed from the outside by "O" ring 46. A thrust washer 52 and tru-arc ring 54 maintains the spindle in its proper juxtaposition in the body and also resists any upward pressure imposed by the reach rods. The spindle 22 extension portion 24 connects to the reach rod 12 by a suitable coupling 26.

To facilitate welding the deck access box 10 into the deck of the ship a sleeve or steel ring 20 is screwed on the outside of the body and sealed with an "O" ring of synthetic rubber at 48 to insure watertightness of the box. Welding is easily performed without damage to the mechanism by unscrewing and removing the lower shell 18 containing the whole indicator assembly from the sleeve. After welding, the body is reassembled to the sleeve 20 and locked thereto by the set screw 9.

The spindle 22 has the indicator assembly 30 coupled to it and it is by this means that the indicator assembly will show the travel position of the valve from open to close including any intermediate position. This indication assembly is most important as the operator needs to know whether the liquids are flowing or not by the relative open-close position of the valve. Referring now to FIGS. 2 and 3 the indicator assembly 30 connects between the spindle 22 and the indicator tab 32 fixed to the body and measures the relative turning movements. The new and improved indicator assembly 30 includes a transmission for providing the rotation of the movable indicators or pointers 34 and 36 (FIG. 3), to accomplish a uniform, non-intermitten, and continuous position indication of the valve open-close status. Pointer 34 and pointer 36 rotate and travel a circular distance proportionally equal to the travel of the valve or other closing device, such as a door, gate, plug valve or other device. The new and improved invention provides a sturdy mechanism which will give many years of service, provide a watertight enclosure with a weldable sleeve 20, provide a deck access box 10 easily installed and set to correspond with the valve actual position, provide a deck access box 10 which is easily lubricated from the deck through lubrication fitting 40, provide a fixed pointer 36 which can be set to show "shut" position and pointer 34 adjusted to indicate "Open" position.

Figure 5:
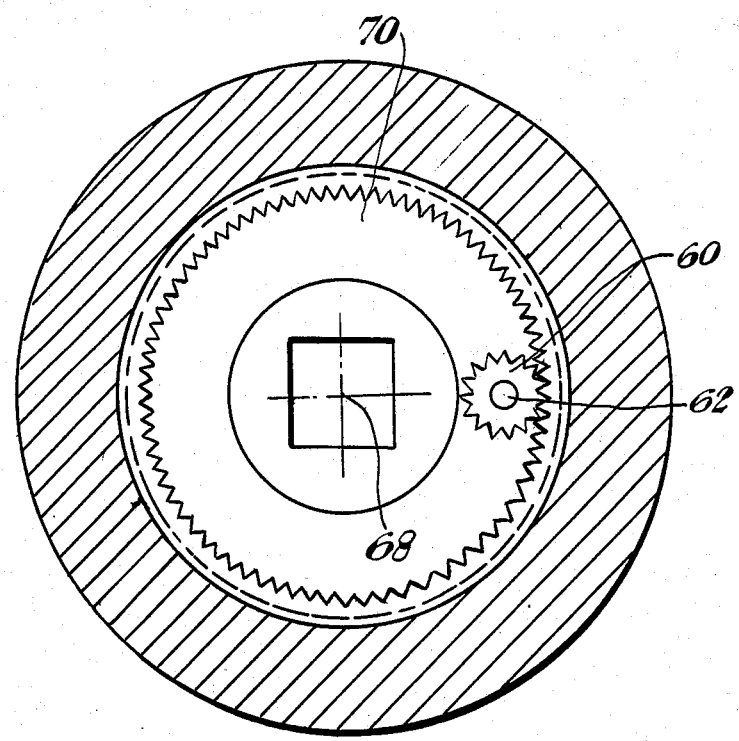
FIG. 5 is a cross sectional view of FIG. 2 taken along line C—C looking in the direction of the arrows.

Referring now to FIGS. 2 and 5, the valve positioning indicating assembly 30 is essentially a epicyclic planetary train of differential gears driven by the spindle with the output turning the pointers. The planetary pinion 60 travels around the spindle axis 68 and meshes with two internal ring gears 64 and 66 that are coaxial with the spindle axis 68 and which have the same pitch diameter but different numbers of teeth. For each revolution about the spindle axis 68, the pinion 60 causes one of the ring gears to advance or retract in relation to the other ring gear by the difference in number of teeth between the two ring gears 64 and 66. In a commercial deck access box 10 one ring gear may have 80 teeth and the other 82 teeth, so on each revolution of the pinion 60 around the spindle axis 68, the ring gear with 82 teeth lags behind the 80 tooth gear by two teeth. This difference causes the position indicators 34 and 36 to move to correspond with the valve movement.

Referring now to FIG. 5, a drive ring 70 is fitted on tie spindle 22 and keyed thereto by pin 72. The drive ring 70 rotates with the spindle 22 and revolves about the spindle axis 68, the pinion gear 60 rotating on shaft 62 which is securely fixed to the ring.

Referring now to FIG. 2, the internal ring gear 66 is fixed to the housing or body 18 by key 67 and does not turn. This gear, for example, can have 80 (eighty) teeth. Rotatably resting on top of ring gear 66 is the ring gear 64 which may have, for example, 82 (eighty-two) teeth. Both ring gears 66 and 64, having the same pitch diameter, will mesh properly with pinion 60. As the pinion gear 60 revolves around the axis 68 of the spindle, the pinion gear 60 rotates, as it is meshed with the ring gears, but since ring gear 64 has more teeth than ring gear 66, ring gear 64 rotates or creeps ahead of the other ring gear 66 by the difference in their numbers of teeth. The top ring gear 64 is keyed, as at 85, to the indicator ring 84 so as to rotate the latter with the gear 64. Ring 84 is sealed to the spindle and the body by "O" rings 88 and 90 to insure against liquids or dirt from entering the mechanism chamber.

As shown in FIG. 3, pointer tab 32 is fixed to a shoulder in the body by screws and provides a fixed indication position. The ring 84 and gear 64 are retained on the spindle 22 by retaining tabs 92 fastened to the shoulder by screws and overhanging the ring 84. The tab 32 also overhangs the ring 84 to assist the tabs 92 to prevent the ring 84 from being displaced from its proper position.

Engraved or otherwise affixed to the top of the ring 84 is the marker pointer 36 which, when aligned with the fixed marker tab 32, indicates that the valve or other below deck device, controlled from the access box, is in an extreme position, e.g. closed. Engraved or otherwise affixed to the ring 84 adjacent the pointer 36 is a word, such as "shut", to indicate the purpose of the pointer 36.

As shown in FIGS. 2 and 3, a sleeve 96 fits over the spindle and its lower end screws into indicator ring 84 and is firmly held from turning by set screw 98. An upper lip 100 on the sleeve 96 retains a collar 86 for rotative adjustment relative to the ring 84. A set screw 102 locks the collar, in its adjusted position, to the ring 84. The collar carries the pointer 34 which may be in the form of a pin projecting radially from the collar. The purpose of this pointer 34 is to indicate, when aligned with the fixed tab 32, the other extreme position, e.g. open, of the below deck device, e.g. a valve. Engraved or otherwise affixed on top of the collar adjacent the pointer 34 is a word, such as "open", to indicate the purpose of the pointer 34.

It can be readily seen that starting with the pointer 36 aligned with the tab 32 showing the valve to be shut, by rotating the spindle with a Tee wrench the valve position indicator ring 84, collar 86, and pointer 34 will rotate in unison and in a fixed relation with the rotation of the spindle. The ring 84 is not a digital counter and not intended to count the number of turns made by the spindle, but to provide a uniform indication of the valve position.

The collar 86 is rotatable around the sleeve 96 with the aid of tool-engageable holes 87 to adjust to a proper indication of valve position and then locked in place by the set screws 102. In this way the OPEN position indication can be calibrated to the open position of the valve.

To install the deck access box, it is necessary to calibrate the position indicators 34 and 36 with the actual position of the valve or other below deck device. One way is for the installer to first shut the valve, then, without the reach rods connected, rotate the deck box spindle until shut marking pointer 36 is directly in line with the tab 32. Then securely connect and pin the reach rod to the spindle shaft 24. The spindle is then rotated with a Tee wrench in a direction to open the valve. When the valve is fully "OPEN", the set screw 102 is loosened to free the collar 86 for rotation relative to the ring 84. The collar 86 is then rotated to set the "OPEN" pointer 34 in line with fixed pointer tab 32. Then the set screw 102 is tightened to lock the collar 86 and pointer 34 to the ring 84. For a permanent fix, remove indicator ring 84 and pin collar 86 to indicator ring 84.

Intermediate valve positions can be ascertained by the position of the pointers 34 and 36 relative to the tab 32. Clockwise rotation of the spindle usually results in closing the valve until the "SHUT" position is reached. Counterclockwise rotation usually opens the valve.

It will be seen that the essence of the invention is the means for angularly adjusting the positions of the indicators or pointers 34 and 36 relative to each other. Because of this feature, the deck box embodying this invention can be used to operate below deck devices, and properly calibrated at the time of installation, for precisely indicating the position of the below deck device irrespective of the extent of rotation of the corresponding reach rod necessary to move the below deck device between two positions. Without this feature, it becomes necessary to calibrate heretofore known types of deck access boxes at the factory so as to properly indicate the position of a specific below deck device which requires a specific extent of rotation of a reach rod to move it between two specific positions.

Figure 4:
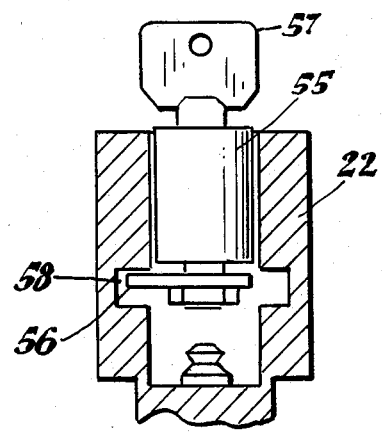
FIG. 4 is an enlarged partial view of the cylinder lock in the top of the spindle.

FIG. 4 is an embodiment showing a means for locking the deck box spindle 22 to prevent unauthorized use. A tumbler cylinder 55 with eccentric latch 56 fits into the square hole of spindle 24. When the key 57 is to lock position the latch extends into the groove 58 thereby preventing the lock from being removed. The key is taken away and it is not possible to insert the Tee wrench for turning.

the instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A deck access box mountable in an aperture in the deck of a ship to operate a below deck mechanical device between two different positions by the turning of a reach rod between two extremities of rotation, comprising:

a tubular housing mountable upright in a deck aperture and having an open upper end;

a spindle rotatably mounted in said housing coaxially therewith and projecting therebelow for detachable connection with a reach rod, the upper end of said spindle being provided with means detachably engageable by tool means for rotating said spindle; and means for indicating the position of the device relative to its said two different positions comprising:

an upper ring gear and a lower ring gear in said housing coaxial with said spindle, said gears being of the same pitch diameter but having different numbers of teeth, said lower gear being fixed and said upper gear being rotatable relative to said housing;

a flat ring overlying and fixed to said upper gear against rotation relative thereto;

at least two first marker means visible through said housing upper end, one of said first marker means being fixed to the upper surface of said ring;

a planetary gear meshing with said ring gears;

means connecting said planetary gear to said spindle for revolution about the axis of said ring gears on rotation of said spindle to thereby rotate said upper gear;

at least one second marker means cooperating with said two first marker means to indicate the position of the below deck device relative its said two different positions, said second marker means being fixedly supported relative to said housing and visible through said housing open upper end;

ring means accessible through said housing open upper end carrying the other of said first marker means, said ring means being coaxially and rotatively mounted to said ring for angular adjustment relative to said one first marker means about the axis of said ring gears for calibrating said indicating means; and means for fixing said ring means to said ring in the adjusted position of said other of said first marker means.

2. The access box defined in claim 1 wherein the means detachably engageable by tool means includes a socket in the upper end of the spindle and including a grease fitting at the bottom of said socket and a lubricant passage extending from said fitting to relatively rotatable bearing surfaces between said spindle and the housing.

3. The access box defined in claim 1 including means carried by the ring means detachably engageable by tool means for rotating said ring means relative to the ring.

4. The access box defined in claim 1 in which the flat ring occupies an annular gap between the housing and the spindle and including O-sealing rings between and continuous to the housing and the ring and between the ring and the spindle.

5. The access box defined in claim 1 including a sleeve fixed to and extending upward from the inner peripheral margin of the flat ring and having a peripheral flange at its upper end overhanging the ring means to rotatively mounted the latter to said ring.

* * * * *